Figure 2:
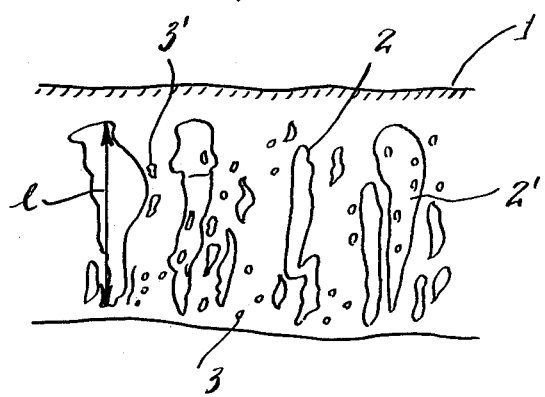

United States Patent [19]

Yamashita

[11] 4,220,543

[45] Sep. 2, 1980

[54] ETHYLENE-VINYL ALCOHOL MEMBRANES HAVING IMPROVED PROPERTIES AND A METHOD OF PRODUCING THE SAME

[75] Inventor: Shuzo Yamashita, Kurashiki, Japan

[73] Assignee: Kuraray Co., Ltd., Kurashiki, Japan

[21] Appl. No.: 962,962

[22] Filed: Nov. 22, 1978

Related U.S. Application Data

[63] Continuation-in-part of Ser. No. 938,484, Aug. 31, 1978, abandoned.

[30] Foreign Application Priority Data

Sep. 6, 1977 [JP] Japan ............................. 52/108251

[51] Int. Cl.$^2$ ............................................. B29D 27/04
[52] U.S. Cl. ................................. 210/500 M; 264/41; 521/61; 521/62; 521/63; 521/64; 521/134
[58] Field of Search ..................... 264/41; 210/500 M; 521/61, 62, 63, 64, 134

[56] References Cited

U.S. PATENT DOCUMENTS

| 3,642,668 | 2/1972 | Bailey et al. | 264/41 X |
| 3,847,845 | 11/1974 | Tada et al. | 264/41 X |
| 3,907,675 | 9/1975 | Chapurlat et al. | 264/41 X |
| 3,963,618 | 6/1976 | Muir | 264/41 X |
| 4,134,837 | 1/1979 | Yamashita et al. | 264/41 X |

FOREIGN PATENT DOCUMENTS

49-113859 10/1974 Japan .

*Primary Examiner*—Philip Anderson
*Attorney, Agent, or Firm*—Barry Kramer

[57] ABSTRACT

A membrane made of a composition containing essentially two kinds of ethylene-vinyl alcohol copolymers with different ethylene unit contents and the membrane has such a microstructure that there are at least one active layer and a porous layer thereunder, the porous layer comprises mono- or multi-layer of a plurality of cylindrical voids and a plurality of spherical voids therein and the membrane is of a porosity of 70 to 95%.

5 Claims, 6 Drawing Figures

FIG. 1
FIG. 4
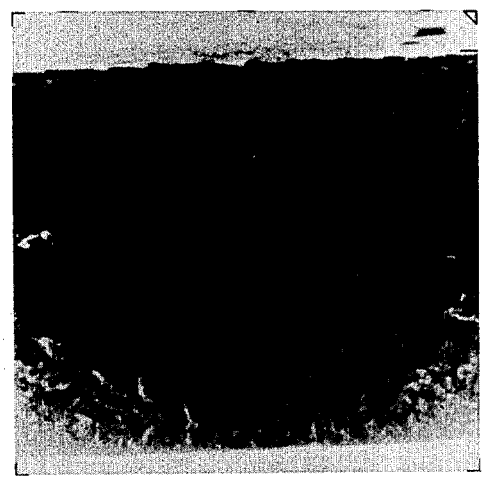
FIG. 5
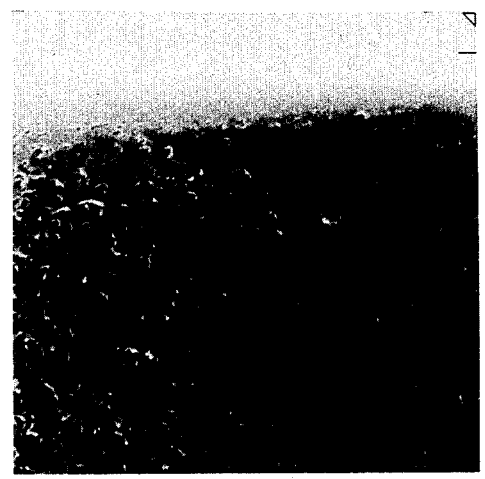
FIG. 6

ETHYLENE-VINYL ALCOHOL MEMBRANES HAVING IMPROVED PROPERTIES AND A METHOD OF PRODUCING THE SAME

This application is a continuation-in-part of my earlier copending application Ser. No. 938,484, filed Aug. 31, 1978, now abandoned.

This invention relates to a membrane useful as a semipermeable membrane, especially as a dialysis membrane for an artificial kidney or for treatment of ascitic fluid, consisting of a polymer composition comprising ethylene-vinyl alcohol copolymers differing in the ethylene unit content from each other, and a method of producing the same.

Although membranes made of cuprammonium process cellulose have so far been used as dialysis membranes, their permeability characteristics are not fully satisfactory, and new dialysis membranes have been hoped for. Dialysis membranes to be used in artificial kidneys are desired to have such permeability characteristics as an appropriately controlled water permeability, high permeabilities to substances of a middle molecular weight ranging from 300 to 6000, low alteration of the permeabilities owing to the molecular weight of the solute and high rejection ratio to requisites such as proteins. For producing an improved membrane, various kinds of high polymers have been investigated with respect to their membrane characteristics.

Ethylene-vinyl alcohol copolymer may be suitable material for making hemodialysis membranes, since it has good biocompatibility, good antihemolytic and antithromogenic properties, and in addition, desirable characteristics such as durability, chemical stability and heat-sealability.

Hirofuji et al have already succeeded in producing a permeable film from an ethylene-vinyl alcohol copolymer (Japanese patent application laid open No. 49-113859). However, their film or membrane was opaque and non-uniform, had a thick skin layer on the surface, and furthermore had a large number of great pores having diameters greater than 2 microns within the inner layer, because they made the membrane by a wet process by dissolving the ethylene-vinyl alcohol copolymer in a solution consisting of water and an alcohol (e.g. water-methanol solution or water-isopropyl alcohol solution). Therefore, although such membrane may have a great permeability to water, the permeability of middle molecular weight substances such as vitamin $B_{12}$ is low, and moreover the rejection ratio for requisites such as proteins is also low. Accordingly, with these membrane characteristics, it cannot be used as a hemodialysis membrane, and, even in cases where it is used for other separation purposes, its application will be greatly limited. As a result, such a membrane from an ethylene-vinyl alcohol copolymer could not have found so far a wide use.

As a result of energetic investigation to develop ethylene-vinyl alcohol copolymer membrane, the present inventor found that a membrane produced by dissolving an ethylene-vinyl alcohol copolymer in a specific solvent and coagulating the polymer by a wet process under mild conditions does not exhibit a non-uniform structure or any large pores, and further can be used as an excellent hemodialysis membrane (Japanese Patent Application No. 50-69873).

The membranes above mentioned are characterized in that the average diameter of the constitutent particles is within the range of 100 to 10000 Å, the membrane is composed of said particles bonded to each other, and there are substantially no pores greater than 2 microns in diameter, when oberved in a dry state with an electron microscope.

Although the above membrane is characterized by an excellent permeability to water and to middle molecular weight substances regarded as factors causative of uremia, it is still desired that the balance between water permeability and solute permeability should be further improved.

The present inventor has continued a study on ethylene-vinyl alcohol copolymer membranes and found that a membrane having a specific, asymmetrical structure different from the uniform structure in the above-mentioned membrane can be produced by using an ethylene-vinyl alcohol copolymer composition with a specific ethylene unit content, and further that permeability characteristics, especially water permeability and solute permeability can be varied to a great extent by adjusting the coagulation temperature. These findings are of very great value, as membranes that have a wide variety of uses can be provided from ethylene-vinyl alcohol copolymers.

The relationship between water permeability and solute permeability will now be discussed briefly. The balance between water permeability and solute permeability should be varied according to or depending on the purposes for which the membrane is used. For example, in the case of a hemolysis membrane, it is desired that the water permeability of above homogeneous ethylene-vinyl alcohol copolymer membrane (abbreviated as EVA membrane) should be decreased by 30 to 40%, while maintaining good permeability to middle molecular weight substances. On the other hand, in industrial applications where various kinds of solutions are to be concentrated, for example, it is desired that permeability to solutes should be decreased but water permeability should be increased. As will be clear from the above explanation, the field of use of the membrane will be widened very much, if water permeability and solute permeability can be controlled easily and at will.

The ethylene-vinyl alcohol copolymer membrane of the invention has a specific asymmetrical structure, and properties thereof can easily be varied by adjusting the coagulation temperature of the membrane.

The present invention provides an ethylene-vinyl alcohol copolymer membrane which consists of a composition comprising a first ethylene-vinyl alcohol copolymer (polymer A) with an ethylene unit content of 20 to 90 mole % and a second ethylene-vinyl alcohol polymer (polymer B) with an ethylene unit content of 1 to 2 mole %, the difference between said two ethylene unit contents being not less than 5 mole %, and said polymer A and said polymer B being present in a weight ratio (A/B) of 95/5 to 50/50. Said membrane, when observed at a dry state with an electron microscope, consists of at least one active layer on the surface of said membrane and a porous layer thereunder, the porous layer comprising a mono-layer or multi-layers of a plurality of cylindrical voids with a length of longitudinal axis or axes in total thereof corresponding to 50 to 98% of the membrane thickness and a plurality of spherical voids with a diameter of from 1 to 20 microns respectively, and said membrane being of a porosity of 70 to 95%.

The first feature of the invention consists in that the membrane consists of a composition of polymer A and polymer B. Membranes consisting of one single component, either polymer A or polymer B, are disclosed in Japanese Patent Application No. 50-69873 as cited above. However, it was noted by the inventor, that membranes made of one single EVA copolymer have their limit in regard to performance thereof, and that it is difficult to overstep the boundary with one ethylene-vinyl alcohol copolymer only. With the above recognition, the inventor has made membranes from a composition consisting of two kinds of ethylene-vinyl alcohol copolymers, and unexpectedly has found that the membranes from said composition are quite different in microstructure thereof from membranes from one EVA copolymer and the former membranes have much improved properties.

In accordance with the invention, it is necessary that an ethylene-vinyl alcohol copolymer with an ethylene unit content of 20 to 90 mole % and another ethylene-vinyl alcohol copolymer with an ethylene unit content of 1 to 20 mole % are so selected as polymer A and polymer B, respectively, that the difference between said two ethylene unit contents is not less than 5 mole %, and it is also necessary that said polymer A and said polymer B are present in a weight ratio (A/B) between 95/5 and 50/50. Compositions which do not meet these requirements cannot give ethylene-vinyl alcohol copolymer membranes that can be used as dialysis membranes with a sufficient strength and possess a specific find structure to be stated hereinafter.

The ethylene-vinyl alcohol copolymer composition to be used in accordance with the invention is, advantageously, prepared by blending said polymer A and said polymer B in a predetermined ration. It is also possible to prepare the composition comprising polymer A and polymer B at once by carrying out the copolymerization of ethylene and vinyl acetate while adjusting polymerization conditions, for example, by adjusting the amount of ethylene in the reaction system or exchanging the solvent in the course of the polymerization, and saponifying the resulting mixture comprising two kinds of ethylene-vinyl acetate copolymers with different ethylene unit contents, respectively.

In case of any deviation from the ranges defined in accordance with the invention, no or little improvement can be attained in respect of the balance between water permeability and solute permeability, as indicated by the results shown in the following table. When a polymer A was combined with another polymer A or a polymer B with another polymer B, the product was too defective to be used as a dialysis membrane with regard to said balance of mechanical properties.

| No. | Ethylene unit content (mole %) | Blending ratio (wt/wt) | Permeability Water (ml/m²·hr·mmHg) | Permeability Uric acid (cm/min × 10⁻⁴) |
|---|---|---|---|---|
| 1 | 33 | — | 10.5 | 115 |
| 2 | 33/18 | 97/3 | 10.5 | 120 |
| 3 | 33/6.2 | 93/7 | 10.5 | 160 |
| 4 | 20 | — | 10.5 | 180 |
| 5 | 20/18 | 80/20 | 10.5 | 180 |
| 6 | 20/6.2 | 80/20 | 10.5 | 210 |

Another feature of the invention is that the membrane not only has the above composition but is also entirely different in microstructure from the conventional EVA copolymer membranes.

Thus, when observed in a dry state with an electron microscope, the membrane has a very thin active or a skin layer of dense microstructure on the surface and a specific porous layer thereunder. Said porous layer comprises mono- or multi-layers of a plurality of cylindrical voids with a length of longitudinal axis or axes in total thereof corresponding to 50 to 98% of the membrane thickness and a plurality of spherical voids with a diameter of 1 to 20 microns, respectively. Such porous layers with cylindrical voids and spherical voids with diameters of the order of microns are novel ones that cannot be found in any other porous layers. Said cylindrical and spherical voids may be present in a mono- or multi- (two or more) layer structure, as to be mentioned later. This can be accomplished by coagulating the membrane from one face or from both faces. In any of the structures, the total length of the longitudinal axes of said cylindrical voids amounts, in the direction of the membrane thickness, to 50 to 98% of the membrane thickness.

The membrane of the invention has a porosity of between 70% and 95%. The porosity herein is determined by the formula $$P = (1 - \rho b/\rho a) \times 100$$

where $\rho a$ is the specific gravity of the membrane without any voids and $\rho b$ is the quotient given by dividing the membrane weight by the membrane volume.

Said characteristic structure of the porous layer and the existence of the active layer are considered to be one of the reasons why the water permeability and solute permeability of the ethylene-vinyl alcohol copolymer membrane of the invention can easily be controlled.

The fact that a membrane made of one single ethylene-vinyl alcohol copolymer and a membrane made of a composition comprising two ethylene-vinyl alcohol compolymers are of quite different microstructure respectively, could never had been expected at all prior to research works thereon.

In the drawings, FIG. 1 is a photomicrograph (magnification 300×) of a membrane according to the invention taken with an electron microscope, and FIG. 2 a schematic representation of the same. In FIG. 2, 1 is a dense active layer on the surface of the membrane, 2, 2' ... are cylindrical voids and 3, 3' ... are the spherical voids. The largest ones of said cylindrical voids have a length corresponding to 98% of the membrane thickness, and the average length of said voids is in most cases about 80%. The membrane contains therein spherical voids of the order of microns in diameter, and "spherical" in this context means more close to spheres in comparison with said cylindrical void. It will easily be understood that the definitions of these two kinds of voids are not critical but should be construed with a reasonable latitude.

Figure 3:
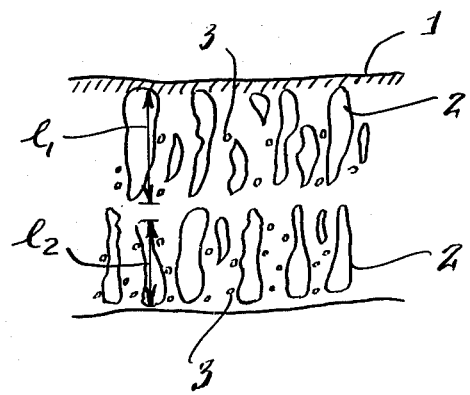

The length of the longitudinal axis of a cylindrical void is the distance between two such ends of said void that are most remote to each other in the direction of the membrane thickness, such length being represented by "l" in FIG. 2. FIG. 3 is a schematic representation of a membrane wherein cylindrical voids are present in two-layer structure, and in this case the sum of the lengths of the longitudinal axes of said voids is $l_1 + l_2$, as shown in FIG. 3.

FIG. 4 is an electron micrograph at 6,000 magnification showing the structure in the neighborhood of the surface layer of a membrane according to the present invention. The voids that can be seen in FIG. 4 are spherical and each has a diameter of the order of microns. Further, it is to be noted that the active layer near the surface has a dense and compact structure, while the internal polymer layer has a particulate structure.

FIG. 5 is an electron micrograph at 2,400 magnification showing the structure of a membrane produced by the same method of production as the present invention from one single ethylene-vinyl alcohol copolymer. From FIG. 5, it is seen that the whole membrane has a substantially uniform structure, and there cannot be found any porous structure.

FIG. 6 is an electron micrograph (magnification 2,400×) showing the structure of an ethylene-vinyl alcohol copolymer membrane disclosed in a Japanese patent application laid open No. 49-113859. FIG. 6 reveals that said membrane has a dense and compact surface layer and a great number of relatively large pores with diameters of not less than 2 microns in the inner layer. The photomicrographs demonstrate that the micro structure of the membrane according to the present invention is novel and very characteristic.

Although the reason why a membrane prepared from a composition comprising two kinds of ethylene-vinyl alcohol copolymers can have such a structure as mentioned above has not yet been fully elucidated, the present inventor is of the opinion that a complicated coagulation reaction occurs during the membrane formation by wet coagulation of said composition as a result of the difference in coagulability between the two ethylene-vinyl alcohol copolymers.

The electron micrographs herein were prepared in the following manner. A dried membrane obtained by the method to be described hereinafter was frozen in liquid nitrogen, and broken. Gold was deposited on the fractured surface to a thickness of 100 Å by vapor deposition, and the fracture was observed under an electron microscope, Model HFS-2 manufactured by Hitachi, Ltd.

According to the invention, the membranes produced by coagulation at lower temperatures to be mentioned hereinafter show permeability to water of 3 to 20 ml/m$^2$·hr·mmHg, permeability to uric acid of 100 to $300 \times 10^{-4}$ cm/min, and permeability to VB$_{12}$ of 25 to $70 \times 10^{-4}$ cm/min. In the case of the membranes produced by higher temperature coagulation, permeability to water is not less than 20 ml/m$^2$·hr·mmHg, permeability to uric acid not more than $100 \times 10^{-4}$ cm/min, and permeability to VB$_{12}$ not more than $25 \times 10^{-4}$ cm/min, respectively.

The methods of producing the membranes according to the invention will now be explained below.

The above-mentioned membranes are produced by coagulating a polymer solution prepared by dissolving said ethylene-vinyl alcohol copolymers with different ethylene unit contents in a solvent comprising dimethyl sulfoxide, dimethylacetamide, methylpyrrolidone, pyrrolidone or a mixture thereof in a coagulation bath containing essentially water. The membrane formation in an aqueous coagulation bath is especially carried out at a polymer concentration (C) of said solution in the range of 10 to 40% by weight and at a temperature of $-15°$ to $80°$ C.

While the ethylene-vinyl alcohol copolymers to be used in the invention may be any of random, block and graft polymers, one with an ethylene unit content of 20 to 90 mole %, more preferably 20 to 65 mole %, is preferred as polymer A with regard to mechanical strength, compatibility to the other polymer and biocompatibility, and one with an ethylene unit content of 1 to 20 mole % is preferred as polymer B in consideration of permeability (especially to water) and compatibility to the other polymer. The degree of saponification of the copolymer should be at least 80 mole % (based on the vinyl alcohol units in the copolymer), preferably not less than 95 mole %, because a degree of saponification less than 80 mole % will result in insufficient wet mechanical strength. Usually, the polymers with degrees of saponification not less than 99 mole %, are used. However, while polymer A, which is the main constituent member, is desired to have a relatively high degree of saponification, even a polymer with a degree of saponification less than 80 mole % may be used as polymer B. The ethylene-vinyl alcohol copolymers may be the copolymers with another copolymerizable monomer such as methacrylic acid, vinyl chloride, methyl methacrylate, acrylonitrile and vinylpyrrolidone in an amount not more than 15 mole %, and further cross linkages may be introduced into the ethylene-vinyl alcohol copolymers before or after the membrane formation by treating them with an inorganic cross-linking agent such as a boron compound or an organic cross-linking agent such as a diisocyanate or a dialdehyde. The copolymers may also be the ones wherein the functional hydroxyl groups of vinyl alcohol units are partially acetalized with an aldehyde such as formaldehyde, acetaldehyde, butyraldehyde or benzaldehyde to an extent not more than 30 mole %.

Furthermore, it is preferred that the ethylene-vinyl alcohol copolymers to be used in the invention have viscosity within the range of 1.0 to 50 centipoises, when the viscosity is measured with a dimethyl sulfoxide solution of the polymer at a concentration of 3% by weight at 30° C. using a Brookfield viscometer. In case the viscosity is below said range, it means a lower degree of polymerization, desirable mechanical properties for the membrane cannot be obtained, and on the other hand, higher viscosities will bring about difficulty in membrane formation.

Solvents known to be capable of dissolving ethylene-vinyl alcohol copolymers include monohydric alcohols (e.g. methanol, ethanol), polyhydric alcohols (e.g. ethylene glycol, propylene glycol, glycerol), phenol, metacresol, formic acid, and mixtures thereof with water. Among them, however, for the purpose of producing hemodialysis membranes with desirable balanced permeabilities to water and solutes, dimethyl sulfoxide, dimethylacetamide, methylpyrrolidone, pyrrolidone, mixtures thereof and aqueous solutions thereof, are preferred. Especially preferred is dimethyl sulfoxide, which shows high solubility to ethylene-vinyl alcohol copolymers. When the ethylene-vinyl alcohol copolymers are dissolved in a solvent mentioned above, especially in dimethyl sulfoxide, the solvent may contain other solvents such as water, methanol, isopropyl alcohol or dimethyl-formamide, or other liquids miscible with the solvent, and also an inorganic salt, as long as the precipitation point (the temperature at which ethylene-vinyl alcohol copolymers begins to precipitate during cooling the solution gradually) remains at 60° C. or below.

The concentration of the ethylene-vinyl alcohol copolymers in the solution mentioned above is preferably in the range between 10 and 40% by weight. The temperature of the polymer solution is preferably maintained at 0° to 120° C., more preferably at 5° to 60° C. At higher temperatures, deterioration of the polymers may occur, and at lower temperatures, the viscosity of the solution will disadvantageously be too high, making the membrane formation difficult.

The coagulating agent to be used in the coagulating bath is an aqueous medium. The aqueous medium may consist either of water alone or of water and a water-miscible organic solvent, usually the same one as is used for the polymer solution, to an extent of 70% by weight, and may also contain an inorganic salt such as sodium sulfate.

The coagulation conditions, especially the coagulation temperature, are of essential importance for producing the present membrane. Thus, membranes with low water permeability and high solute permeability (in particular, water permeability of 3 to 20 ml/m$^2$.hr.mmHg, uric acid permeability of 100 to $300 \times 10^{-4}$ cm/min and VB$_{12}$ permeability of 25 to $70 \times 10^{-4}$ cm/min) are produced, when coagulation of a polymer solution with a polymer concentration (C) of 10 to 40% by weight is carried out in a coagulation bath maintained at a temperature (°C.) satisfying the following conditions:

in case $10 \leq C < 25$, $-15 \leq T \leq C - 10$ and in case $25 \leq C \leq 40$, $C - 40 \leq T \leq 2C - 35$.

If the coagulation is carried out in a coagulation bath maintained at a temperature satisfying the following conditions:

in case $10 \leq C < 25$, $C - 10 < T \leq C + 40$ and in case $25 \leq C \leq 40$, $2C - 35 < T \leq C + 40$ membranes with high water permeability and low solute permeability (in particular, water permeability of 20 ml/m$^2$.hr.mmHg or above, uric acid permeability of $100 \times 10^{-4}$ cm/min or less, and VB$_{12}$ permeability of $25 \times 10^{-4}$ cm/min or less) are produced. The coagulation in the former case where a relatively low temperature is employed and that in the latter case where a relatively high temperature is made use of may be called "low temperature coagulation" and "high temperature coagulation", respectively.

It is one of the features of the invention that membranes with varied properties can be produced by merely adjusting the temperature of the coagulation bath.

The membranes produced may be used either as wet or in the form of dry membranes after drying.

The methods of drying include replacing water contained in the membrane with an organic solvent miscible with water but incapable of dissolving the polymers such as acetone, methanol, ethanol or tetrahydrofuran followed by removing the organic solvent by heating, for instance; treating the membrane during or after formation thereof with a polyhydric, aliphatic alcohol such as ethylene glycol, diethylene glycol or glycerol followed by drying the same under heating at a relatively low temperature; freezing the wet membrane in liquid nitrogen or the like, followed by sublimation of frozen water under reduced pressure and any other appropriate drying methods.

The present membranes of the ethylene-vinyl alcohol copolymers are formed in the form of films, tubes or hollow fibers depending on the pattern of use, with or without supporting members. The coagulation may also be carried out in a plurality of baths (a multi-bath system), and in this case at least the temperature of the first coagulation bath is required to satisfy the specific conditions mentioned above. The film has a thickness of 10 to 100 microns, and the hollow fibers have each an external diameter of 50 to 1500 microns and a wall thickness of about 10 to about 300 microns.

The permeabilities to water, uric acid and vitamin B$_{12}$ described herein were determined in the following manner:

(1) The water permeability K' was determined by the use of the following formula from a measurement at 37° C. and at a pressure of 100 to 300 mmHg:

$K' + V/A.t.\Delta P$ (ml/m$^2$.hr.mmHg)

wherein V is the volume of permeated water (cm$^3$), A the area of the dialysis membrane (cm$^2$), t the time of permeation (sec) and $\Delta P$ the pressure (dynes/cm$^2$) at which the measurement is made, that is $\Delta P = 980$ (13.54 y + x) Cg/cm.sec$^2$ in which y is the height of the mercury column and x is the height of the water column of the measuring cell.

(2) The measurement for each of the permeabilities to uric acid and vitamin B$_{12}$ was made at 37° C. and the overall permeability (Po) was determined according to the formula:

$$Po = \frac{\ln(\Delta Ct'/\Delta Ct'')}{A(1/V_1 + 1/V_2)(t'' - t')} \text{ (cm/min)}$$

wherein,
$\Delta Ct' = [Ct']_1 - [Ct']_2$
$\Delta Ct'' = [Ct'']_1 - [Ct'']_2$
$[Ct']_1$ and $[Ct'']_1$: concentration of the solution of uric acid etc. (first cell) after permeation for t' and t'' minutes respectively.
$[Ct']_2$ and $[Ct'']_2$: concentration of the solution containing solute permeated through the membrane (second cell) after permeation for t' and t'' minutes respectively.
V$_1$: volume of the solution of uric acid etc. (first cell)
V$_2$: volume of the solution containing permeated solute. (second cell)

The ethylene-vinyl alcohol copolymer membranes of the present invention possess excellent properties suitable for use as hemodialysis membranes in artificial kidneys, as mentioned previously. The membranes may also be useful as separation membranes for bacteria, proteins, viruses and colloidal substances, as dialysis membranes for other purposes and as ultrafiltration membranes.

The following examples will explain the invention.

EXAMPLE 1

An ethylene-vinyl alcohol copolymer with an ethylene unit content of 33 mole % and a degree of saponification not less than 99% is dissolved in mixed solvents of methanol-water or propanol-water and dimethyl sulfoxide respectively and the solution was made into a membrane under various conditions. The permeability characteristics of the resultant membranes are shown in Table 1 as numbered 1 to 4. The results of permeability measurements of the membranes produced in accordance with the invention, in which a composition of two polymers with different ethylene unit contents is used and there shows excellent balance between water permeability and solute permeability, are summarized in the lines numbered 5 to 11 in Table 1.

As apparent from Table 1, the membranes produced by using alcohol-water mixed solvents lack balance between water permeability and solute permeability required for hemodialysis membranes. Contrary to the water-alcohol solvent systems, dimethyl sulfoxide could cause significant improvement in balance between water permeability and solute permeability even of membranes from one single ethylene-vinyl alcohol copolymer (No. 8 and No. 10). Still further improvement, in said balance, however, is required to make them suitable as hemodialysis membranes.

As the data in Table 1 clearly show, the membranes produced under specific coagulation conditions defined herein according to the invention had much more improved balance between water permeability and solute permeability.

EXAMPLE 2

Table 2 shows how much the membrane characteristics can be varied by after-treating the wet membranes shown in Table 1.

As is clear from Table 2, acetone replacement, or glycerol treatment, followed by drying at room temperature did not alter the permeability, giving dry membranes with excellent permeability characteristics retained. In case a composition was used of an ethylene-vinyl alcohol copolymer (polymer A) with an ethylene unit content of 33 mole % with an ethylene-vinyl alcohol copolymer (polymer B) with an ethylene unit content of 6.2 mole %, which had a high glass transition temperature, in an amount of 20%, the resultant membrane containing glycerine has an improved heat resistance by 40% as compared with a glycerine-containing membrane made of one single ethylene-vinylalcohol copolymer. Said heat resistance means a percent retention of water permeability after allowing the glycerine-containing membrane to stand in a thermostat maintained at 45° C. for 12 hours in comparison with the value before the heat treatment.

Table 1

| Sample No. | Ethylene content (mole %) | Blending ratio (wt./wt.) | Solvent (volume ratio) | Solution Temperature (° C.) | Permeability | | | Appearance of wet membrane |
| | | | | | Water (ml/m². hr. mmHg) | Uric acid (cm/min $\times 10^{-4}$) | $VB_{12}$ (cm/min $\times 10^{-4}$) | |
|---|---|---|---|---|---|---|---|---|
| 1 | 33 | — | Propanol/water (50/50) | 40 | 55 | 90 | 10 | Opaque |
| 2 | 33 | — | Methanol/water (70/30) | 60 | 5 | 20 | 0 | Opaque |
| 3 | 33 | — | Dimethyl solfoxide | 40 | 10.5 | 115 | 33 | Transparent |
| 4 | 33 | — | Dimethyl solfoxide | 40 | 15 | 135 | 43 | Transparent |
| 5 | 33/6.2 | 93/7 | Dimethyl solfoxide | 40 | 10.5 | 160 | 40 | Opaque |
| 6 | 33/6.2 | 88/12 | Dimethyl solfoxide | 40 | " | 173 | 43 | Opaque |
| 7 | 33/6.2 | 81/19 | Dimethyl solfoxide | 40 | 9.0 | 206 | 44 | Opaque |
| 8 | 45 | — | Dimethyl solfoxide | 40 | 10.5 | 118 | 34 | Opaque |
| 9 | 45/6.2 | 89/11 | Dimethyl solfoxide | 40 | " | 155 | 40 | Opaque |
| 10 | 55 | — | Dimethyl solfoxide | 40 | 5.0 | 67 | 18 | Opaque |
| 11 | 55/6.2 | 93/7 | Dimethyl solfoxide | 40 | " | 125 | 37 | Opaque |

Coagulation bath temperature: 0° to 2° C.

Table 2

| Sample No. | Conditions of after-treatment | Permeability Water (ml/m²·hr.mmHg) | Uric acid (cm/min × $10^{-4}$) | Vitamin $B_2$ (cm/min × $10^{-4}$) |
| --- | --- | --- | --- | --- |
| 1 | Sample No. 4 in Table 1 | 10.5 | 115 | 33 |
| 2 | No. 1 is subjected to acetone replacement, and then dried at room temperature | " | " | " |
| 3 | No. 1 is treated with 40% glycerol solution of water and then dried at room temperature | " | " | " |
| 4 | No. 3 is allowed to stand at 45° C. for 12 hours | 4.2 | 57.5 | 17 |
| 5 | Sample No. 5 in Table 1 | 10.5 | 160 | 40 |
| 6 | No. 5 is treated with acetone and then dried at room temperature | " | " | " |
| 7 | No. 6 is treated with 40% glycerol solution of water and then dried at room temperature | " | " | " |
| 8 | No. 7 is heat-treated at 45° C. for 12 hours | 6.5 | 128 | 31 |
| 9 | Sample No. 6 in Table 1 | 10.5 | 173 | 43 |
| 10 | No. 9 is treated with acetone and then dried at room temperature | " | " | " |
| 11 | No. 10 is treated with 40% glycerol solution of water and then dried at room temperature | " | " | " |
| 12 | No. 11 is heat-treated at 45° C. for 12 hours | 7.6 | 147 | 37 |
| 13 | Sample No. 7 in Table 1 | 9.0 | 206 | 44 |
| 14 | No. 13 is treated with acetone and then dried at room temperature | " | " | " |
| 15 | No. 14 is treated with 40% glycerol solution of water and then dried at room temperature | " | " | " |
| 16 | No. 15 is heat-treated at 45° C. for 12 hours | 7.4 | 175 | 38 |

EXAMPLE 3

The composition of two kinds of ethylene-vinyl alcohol copolymers are dissolved in dimethyl sulfoxide to prepare dopes being of a polymer concentration of 20 wt%, and the dopes are formed into membranes by coagulating them in water bath at 30° C. and 50° C. respectively. Particulars of the membranes and water permeabilities thereof are tabulated in Table 3.

Table 3

| | Ethylene unit content mole % | Composition of polymer A to polymer B | Coagulation temp. °C. | Water permeability ml/m²·hr·mmHg | Appearance of wet membrane |
| --- | --- | --- | --- | --- | --- |
| 1 | 33/6.2 | 93/7 | 30 | 78 | Opaque |
| 2 | 33/6.2 | 93/7 | 50 | 640 | Opaque |
| 3 | 33/6.2 | 88/12 | 30 | 209 | Opaque |
| 4 | 33/6.2 | 81/19 | 30 | 970 | Opaque |

What is claimed is:

1. An ethylene-vinyl alcohol copolymer membrane which consists of a composition comprising a first ethylene-vinyl alcohol copolymer (polymer A) with an ethylene unit content of 20 to 90 mole % and a second ethylene-vinyl alcohol copolymer (polymer B) with an ethylene unit content of 1 to 20 mole %, the difference between said two ethylene unit contents of the copolymers being not less than 5 mole %, and said polymer A and said polymer B being present in a weight ratio (A/B) of 95/5 to 50/50.

2. An ethylene-vinyl alcohol copolymer membrane as claimed in claim 1, wherein said membrane, when observed in a dry state with an electron microscope, consists of at least one active layer on the surface of said membrane and a porous layer thereunder, the porous layer comprising mono- or multi-layers of a plurality of cylindrical voids with a length of longitudinal axis or axes in total thereof corresponding to 50 to 98% of the membrane thickness and a plurality of spherical voids with a diameter of 1 to 20 microns respectively, and said membrane being of a porosity of 70 to 95%.

3. A method of producing EVA copolymer membrane which comprises extruding a dope into a coagulation bath consisting essentially of water at a temperature between −15° and 80° C., wherein said dope comprises a composition containing a first ethylene-vinyl alcohol copolymer (polymer A) with an ethylene unit content of 20 to 90 mole % and a second ethylene-vinyl alcohol copolymer (polymer B) with an ethylene unit content of 1 to 20 mole %, the difference between said two ethylene unit contents of the copolymers being not less than 5 mole %, and said polymer A and said polymer B being present in a weight ratio (A/B) of 95/5 to 50/50, and a solvent selected from the group consisting of dimethylsulfoxide, dimethylacetamide, methylpyrrolidone, pyrrolidone and mixtures thereof, whereby said polymers are dissolved therein at a concentration of 10 to 40 weight %, and recovering the resulting membrane from the coagulation bath.

4. A method according to claim 3, wherein said dope with a polymer concentration (C in %) between 10 and 40% by weight is made into a membrane in a coagulation bath at a temperature (T) satisfying the following relations:

in case $10 \leq C < 25$, $-15 \leq T \leq C-10$ and in case $25 \leq C \leq 40$, $C-40 \leq T \leq 2C-35$.

5. A method according to claim 3, wherein said polymer solution with a polymer concentration (C in %) between 10 and 40% by weight is made into a membrane in a coagulation bath at a temperature (T) satisfying the following relations:

in case $10 \leq C < 25$, $C - 10 < T \leq C + 40$ and in case $25 \leq C \leq 40$, $2C - 35 < T \leq C + 40$

* * * * *